(12) United States Patent
Allred

(10) Patent No.: US 8,041,121 B1
(45) Date of Patent: Oct. 18, 2011

(54) ALGORITHM FOR RAPID ENDMEMBERS DETERMINATION (ALRED) IN HYPERSPECTRAL DATA

(75) Inventor: Clark L. Allred, Meford, MA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 1826 days.

(21) Appl. No.: 09/137,868

(22) Filed: Aug. 14, 1998

(51) Int. Cl.
*G06K 9/46* (2006.01)
(52) U.S. Cl. ........................................ 382/191
(58) Field of Classification Search ............... 382/191, 382/225, 224, 207; 348/269, 207
See application file for complete search history.

(56) References Cited

U.S. PATENT DOCUMENTS

| | | | | | |
|---|---|---|---|---|---|
| 5,379,065 | A | * | 1/1995 | Cutts | 348/269 |
| 6,018,587 | A | * | 1/2000 | Cabib | 382/165 |
| 6,038,344 | A | * | 3/2000 | Palmadesso et al. | 382/191 |
| 6,075,891 | A | * | 6/2000 | Burman | 382/191 |

* cited by examiner

*Primary Examiner* — Mark Hellner
(74) *Attorney, Agent, or Firm* — AFMCLO/JAZ; William G. Auton

(57) ABSTRACT

A method for rapid processing of large sets of hyperspectral data. A hyperspectral image, with hundreds of thousands to millions of pixels measured at hundreds of wavelengths, can contain over a gigabyte of data. Even modern computers can be quite slow when performing involved calculations on data sets of this size. An algorithm requiring a minimal amount of floating point calculations that still yielded useful results is disclosed.

2 Claims, 9 Drawing Sheets

ALGORITHM FOR RAPID ENDMEMBERS DETERMINATION (ALRED) IN HYPERSPECTRAL DATA

STATEMENT OF GOVERNMENT INTEREST

The invention described herein may be manufactured and used by or for the Government for governmental purposes without the payment of any royalty thereon.

REFERENCE TO SOURCE CODE APPENDIX

Reference is made to the source code appendix which is the most advanced version of the source code of the present invention at the time of filing.

BACKGROUND OF THE INVENTION

The present invention relates generally to spectroscopy, and more specifically the invention pertains to an algorithm for rapidly estimating basis spectra ('endmembers') for use in analysis of hyperspectral data.

Hyperspectral data consists of hundreds of digital images, each spatially coincident image measured at a different wavelength. Each pixel in the image, then, has measured value at hundreds of wavelengths, and a spectrum of measured values vs. wavelength can be plotted for each pixel. This spectrum can also be thought of as a vector with magnitude and direction in come multi-dimensional space, with the perpendicular coordinate axes spanning this space being the wavelengths at which measurements were made. The measured spectra are then lists of coordinates for a point in this space.

When one makes a scatterplot in multiple dimensions with every pixel in the image plotted as such a point, the entire data set can be viewed as a 'data cloud'—the scatterplot with thousands of points plotted from the data resembles a cloud. Points inside the data cloud can often be usefully modeled as a linear combination of points near the 'hull' of the data cloud. The physical interpretation of this model is that points on the hull of the data cloud may correspond to pixels that have uniform and unique spectral composition (uniform surface properties), and points inside the data cloud correspond to pixels with inhomogeneous composition describable as mixtures of the supposedly pure pixels of the hull.

An example of a system that acquires hyperspectral data is in U.S. Pat. No. 5,379,065, Jan. 3, 1995, Programmable hyperspectral image mapper with on-array processing, the disclosure of which is incorporated herein by reference.

An ideal case for hyperspectral data analysis is using the 'convex hull' approach would be data that, when scatterplotted, fell within (and even outlined) an obvious simplex. For two wavelength measurements, a two-dimensional simplex is a triangle. For three wavelength measurements, the corresponding simplex is a tetrahedron. Imagine, for the moment, the two-dimensional case. If the data cloud is of a triangle shape, then one may imagine trying to find a 'best fit' triangle to the data cloud. If this is done, the vertices of the data cloud could then be taken as points (representing spectra) that describe the rest of the data. That is, every point inside the triangle can be described as a linear combination of the triangle vertices, where the multipliers on the vertice vectors sum to one and are all greater or equal to zero. Imagine that the three vertices represent the spectra of a tree, a road, and soil. One would interpret the triangle shape of the data cloud, then, to mean that the measured scene was composed uniquely of there three things. The points near the triangle vertice can be taken to be purely tree, purely road, or purely grass. Points inside the triangle vertice are assumed to be a mixture of these three 'endmembers'. Based on the position of data points inside the triangle one can calculate the exact nature of this mixture for each data point.

This calculation of multipliers for the endmembers is called 'spectral unmixing'. For example, a point dead center in the triangle would be described as 1.3 tree, ⅓ road, and ⅓ grass (note the sum of the multipliers is one). A point along the 'hull' (the edge of the triangle) between the road and grass endmember could be ½ A grass, ½ A road, and 0 tree. The results of this unmixing are useful for an analyst trying to assign physical characteristics to each pixel in a hyperspectral image. Fir higher dimensions (often there are hundreds of wavelengths in a hyperspectral data set), one must imagine a data cloud inside a multi-dimensional simplex.

Often, the measured data may intrinsically be of lower dimensionality that the number of wavelengths. Imagine data being measured in the dimensions that falls along a plane when scatterplotted in three dimensions. The physical interpretation of this is that the measured scene contained only three unique spectral signatures and mixtures of these endmembers. It would then be possible to transform the data into a two-dimensional space and so the endmember identification and spectral unmixing in two dimensions (a simpler problem). In this manner, data measured in 200 wavelengths often is only intrinsically 10-15 dimensional Data sets may exist where, physically, no pixels in the image were of a uniform composition. In this case, one may try to fit a simplex around the data cloud and use the extrapolated vertices guarantees a neat mathematical solution to the unmixing problem, but leaves room for error in having found physically relevant endmembers.

Fitting a simplex around a multi-dimensional data cloud in a physically meaningful way is a very difficult mathematical and computational problem. I am unaware of any existing software tools for doing this. Instead, a classic approach to finding endmembers is as follows. Firstly, one performs a principal component transformation on the data set to reduce the data to its intrinsic dimensionality. One then scatterplots the data along various axes, looking for obvious outliers that might be useful as endmembers. Having located several endmembers, one then does the linear spectral unmixing. This process is far from automated and can require hours to complete.

One attempt at automating part of the interactive hunt for endmembers is called "Pixel Purity Index'. This is included in the commercial software package called 'ENVI'. This method iteratively creates random direction vectors, projects the data cloud onto these vectors, and flags pixels that lie at the extremes of the resulting distribution. After doing this thousands of time, it then selects the pixels that were most often flagged in this manner as possible endmembers. One then can interactively select pixels from this reduced number of pixels. This method is quite effective, but can require hours or even days of computing.

SUMMARY OF THE INVENTION

The present invention includes a system and a process that uses an algorithm for rapidly estimating basis spectra ('endmembers') for use in analysis of hyperspectral data. The algorithm aims to locate all unique spectral shapes present in the data. First, all spectra in the data are normalized by area or by vector length. The goal in doing this is to prepare spectra with different total energies for comparison by spectral shape. The algorithm then scans through the hyperspectral data to find maxima and minima at each measured wavelength. The spatial pixels at which maxima and minima were found are then flagged as possible endmembers. The spectra of all flagged pixels are then compared for similarity by calculating correlation coefficients. Spectra with a correlation coefficient above a certain threshold are eliminated as being too similar in shape to other spectra which are kept as endmembers. The remaining spectra can then be used (in their pre-normalization form) as endmembers to do 'spectral unmixing' of the hyperspectral data set. This selection process is extremely rapid compared to iterative or statistical methods for locating likely endmembers, and yields useful results.

It is an object of the invention to estimate basis spectra for analysis of hyperspectral data.

This and many other objects and advantages of the present invention will be readily apparent to one skilled in the pertinent art from the following detailed description of a preferred embodiment of the invention.

DETAILED DESCRIPTION OF THE PREFERRED EMBODIMENT

The present invention is a system and process that uses an algorithm for rapidly estimating basis spectra ('endmembers') for use in analysis of hyperspectral data. The algorithm aims to locate all unique spectral shapes present in the data.

Figure 1:
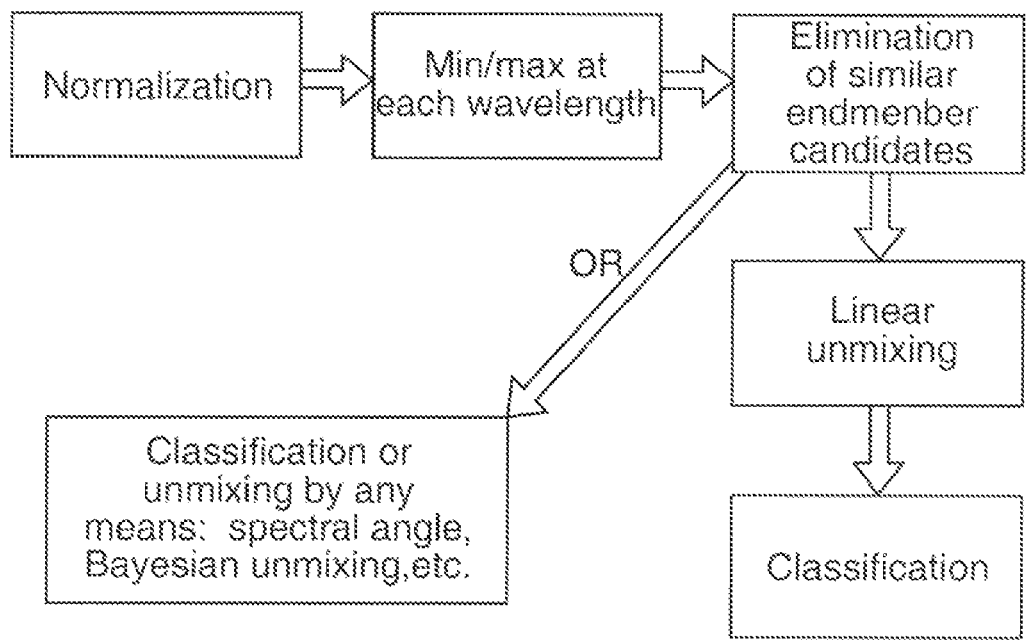
FIG. 1 is a block diagram of the elements of the process of the present invention.

FIG. 1 is a block diagram of the elements of the process of the present invention. First, all spectra in the data are normalized by area or by vector length. The goal in doing this is to prepare spectra with different total energies for comparison by spectral shape. The algorithm then scans through the hyperspectral data to find maxima and minima at each measured wavelength. The spatial pixels at which maxima and minima were found are then flagged as possible endmembers. The spectra of all flagged pixels are then compared for similarity by calculating correlation coefficients. Spectra with a correlation coefficient above a certain threshold are eliminated as being too similar in shape to other spectra which are kept as endmembers. The remaining spectra can then be used (in their pre-normalization form) as endmembers to do 'spectral unmixing' of the hyperspectral data set. This selection process is extremely rapid compared to iterative or statistical methods for locating likely endmembers, and yields useful results.

Having been told that automatic fitting of a simplex to a data cloud is a difficult problem (and were it to be solved, might require more computational time than would be useful), one will wonder how useful endmembers might be located in the data in a rapid automatic fashion. One could find certain points on the hull of the data cloud by simply locating the maximum/minimum values in the data at each measured wavelength. One can then use the points in the cloud (corresponding to spectra) having these maximum/minimum values at one or more wavelengths as endmembers. These points will not necessarily be near the vertices of some ideally-fit simplex, but will certainly be on the hull of the data cloud, and therefore more useful as endmembers that a randomly selected data point.

This idea requires refinement, however. One wants to identify as endmembers all uniquely shaped spectra in the data. Some pixels in the image will be brighter than most others at all wavelengths. As one is looking for shapes in the spectra that are unique, one will need to normalize the spectra somehow before running min/max tests as a search criteria. One can normalize by area under the spectral curve, which corresponds to an energy normalization, or one can normalize by vector length (the distance from the point in multi-dimensional space to the origin).

Pixels having low overall intensity are thrown out, as their spectral shapes will be heavily influenced by noise. After normalization, one calculates the min/max values. Flagged pixels are endmember candidates, and one potentially has twice as many candidates as measured wavelengths (if every min/max occurred at different pixels). One can then eliminate many of the candidates based on their similarity to other candidates. This step can be done using correlation coefficient calculation between all candidates. For spectra that are highly correlated (a threshold is set), all but one are thrown away (or the average of these spectra is kept as an endmember). After eliminating essentially redundant spectra (ones that are too similar), one has a set of spectra that work quite well as endmembers.

Table 1 is the algorithm used in the present invention.

TABLE 1

Here is some sample code that performs an endmember selection on a hyperspectral image:
```
;===============READ CUBE===
a=fltarr(320,640,210)
openr,lun, 'c:\hydicedata\atcr007.cub',/get_lun
readu,lun, a
a=a(7:314,*,*)
orig = a
free_lun,lun
;==========NORMALIZE Spectra BY AREA=====
atot = total(a,3).
mu = total(total(atot,1))/(308.*640.)
stdev = sqrt(total(total((atot-mu)^2,1))/308.*640.))
for i=0,209 do a(*,*,i)=a(*,*,i)/atot
;==========CLEAN OUT THE DIM ONES=====
avspec = total(total(a,1),1)/(308.*640.))
thresh = mu-stdev
dim = where(atot lt thresh,count)
ythr = fix(dim/308.) & xthr = round(((dim/308.)-ythr)*308.)
if count ge 1 then begin
    for I=0,count-1 do a(xthr(i),ythr(i),*)=avspec(*)
endif
;==========SET UP VARIABLES=====
bands = [findgen(91)+10, findgen(27)+111,findgen(53)+152]
nban = n_elements(bands)
temp = fltarr(308,640)
minm = fltarr(nban) & maxm = fltarr(nban)
;=======FIND WHICH PIXELS HAVE MIN OR MAX VALUES
;=======IN ONE BAND (MIN/MAX FOR ENTIRE CUBE)
for i=0,nban-1 do begin
    temp(*,*) = a(*,*,bands(i))
    duma=min(temp,minin) & dumb=max(temp,maxin)
    minm(i)-minin & maxm(i)=maxin
endfor
minm = minm(sort(minm)) & maxm = maxm(sort(maxm))
;==========ELIMINATE REDUNDANT PIXELS=====
minf = [minm(0)] & maxf = [maxm(0)]
for i=1,nban-1 do begin
    if minm(i) ne minm(i-1) then minf=[minf,minm(i)]
    if maxm(i) ne maxm(i-1) then maxf=[maxf,maxm(i)]
endfor
nmin n_elements(minf) & nmax = n_elements(maxf)
;----------------------list of min/max aggregation--
```

TABLE 1-continued

```
biglist = [minf,maxf] & biglist = biglist(sort(biglist))
coord = [biglist(0)]
for i=1,n_elements(biglist)-1 do begin
    if biglist(i) ne biglist(i-1) then coord=[coord,biglist(i)]
endfor
;--------------------------------------------------
;=========CONVERT TO X,Y COORD=====
minx = fltarr(nmin) & miny = minx
maxx = fltarr(nmax) & maxy = maxx
for i = 0,nmin-1 do begin
    dumin = minf(i)/308.
    miny(i) = fix(dumin)
    minx(i) = round((dumin - fix(dumin))*308.)
endfor
for i = 0,nmax-1 do begin
    dumax = maxf(i)/308.
    maxy(i) - fix(dumax)
    maxx(i) = round((dumax - fix(dumax))*308.)
endfor
;-----------------------LIST OF MIN/MAX AGGREGATION---
ybig = fix(coord/308.) & xbig=round(((coord/308.)-ybig)*308.)
device,decomposed=0
plot, orig(xbig(0),ybig(0),*),yrange=[0.,1.],ysty=1
for i=1,n_elements(coord)-1 do $
    oplot, orig(xbig(i),ybig(i),*),color=18*i
;=======SORT OUT THE ENDMEMBER CANDIDATES=====
nem = n_elements(coord)
endmem = fltarr(nem,nban)
for i=0,nem-1 do endmem(i,*) = orig(xbig(i),ybig(i),bands)
means = total(endmem,2)/float(nban)
meansub - endmem
for i=0,nban-1 do meansub(*,i)=endmem(*,i)-means(*)
stdv = sqrt(total(meansub^2,2)/float(nban))
covar = (transpose(meansub)##meansub)/float(nban)
corr = covar
for i=0,nem-1 do begin & for j=0,nem-1 do begin
    corr(i,j) = covar(i,j)/(stdv(i)*stdv(j))
endfor & endfor
;-------GOT THE CORR COEFF, NOW AVERAGE SIMILAR ONES---
endmemf = fltarr(nem,210)
for i=0,nem-1 do endmemf(i,*) = orig(xbig(i),ybig(i),*)
count = fltarr(nem) & count(*)=1.
wcorr = corr
for i=0,nem-1 do wcorr(i:nem-1,i)=0.
wcorr(where(wcorr lt.985))=0.
while total(wcorr) ne 0. do begin
    top = max(wcorr,ind)
    yind = fix(ind/float(nem))
    xind = round(((ind/float(nem))-yind)*nem)
    endmemf(xind,*) = endmemf(xind,*)+endmemf(yind,*)
    endmemf(yind,*) = 0.
    count(xind) = count(xind)+count(yind)
    wcorr(*,yind)=0. & wcorr(yind,*)=0.
endwhile
for i=0,nem-1 do endmemf(i,*)=endmemf(i,*)/count(i)
endmem = fltarr(1,210)
cou = 1.
for i=0,nem-1 do begin
    if total(endmemf(i,*)) ne 0. then begin
        endmemb = [[endmemf(i,*)],endmemb]
        cou = cou+1.
    endif
endfor
endmemb = endmemb(0:cou-2,*)
nemb = size(endmemb)
nemb = nemb(1)
;=========NOW, OUTPUT THE ENDMEMBERS=====
gowav = fltarr(3,210) & lam = fltarr(210)
openr,lun,'d:\forrad1\gainoff\95082400\run07\cr07m82.wav',/get_lun
readf,lun,gowav
free_lun,lun
lam(*) = 1000.*(gowav(1,*))
openw,lun,'d:\endmems1.ascii',/get_lun
for i=0,209 do printf,lun,lam(i),endmemb(*,i),format='(17(g13.6,1x))'
free_lun,lun
end
```

This algorithm's chief advantage is its speed. My IDL implementation of this algorithm run on a Pentium Pro 200 MHz computer takes about 2 minutes to generate endmembers for a 320×640 pixel by 210 wavelength data cube. The results compare very favorable to the slower methods mentioned above.

FIG. 1 is a block diagram of the elements of the present invention. The host system is a system which gathers hyperspectral data, such as the one in U.S. Pat. No. 5,379,065. The data processor may be the Pentium model loaded with the algorithm of Table 1.

The second advantage of this new method is that it is entirely automatic—no user interaction is needed to select endmembers (this is part of what contributes to the algorithm's speed).

As mentioned above, there are various ways of doing the normalization of spectra. In addition, there are different ways of eliminating redundant pixels. Instead of throwing out highly correlated spectra, one could average them together. One could also see if one pixel had been flagged at multiple wavelengths and throw out similar ones flagged only once. Instead of calculating a correlation between spectra, one might also calculate the angle between vectors (the points in the data cloud) to check for similarity.

FIG. 1 is a block diagram of an algorithm for rapid endmembers determination (ALRED).

Figure 2:
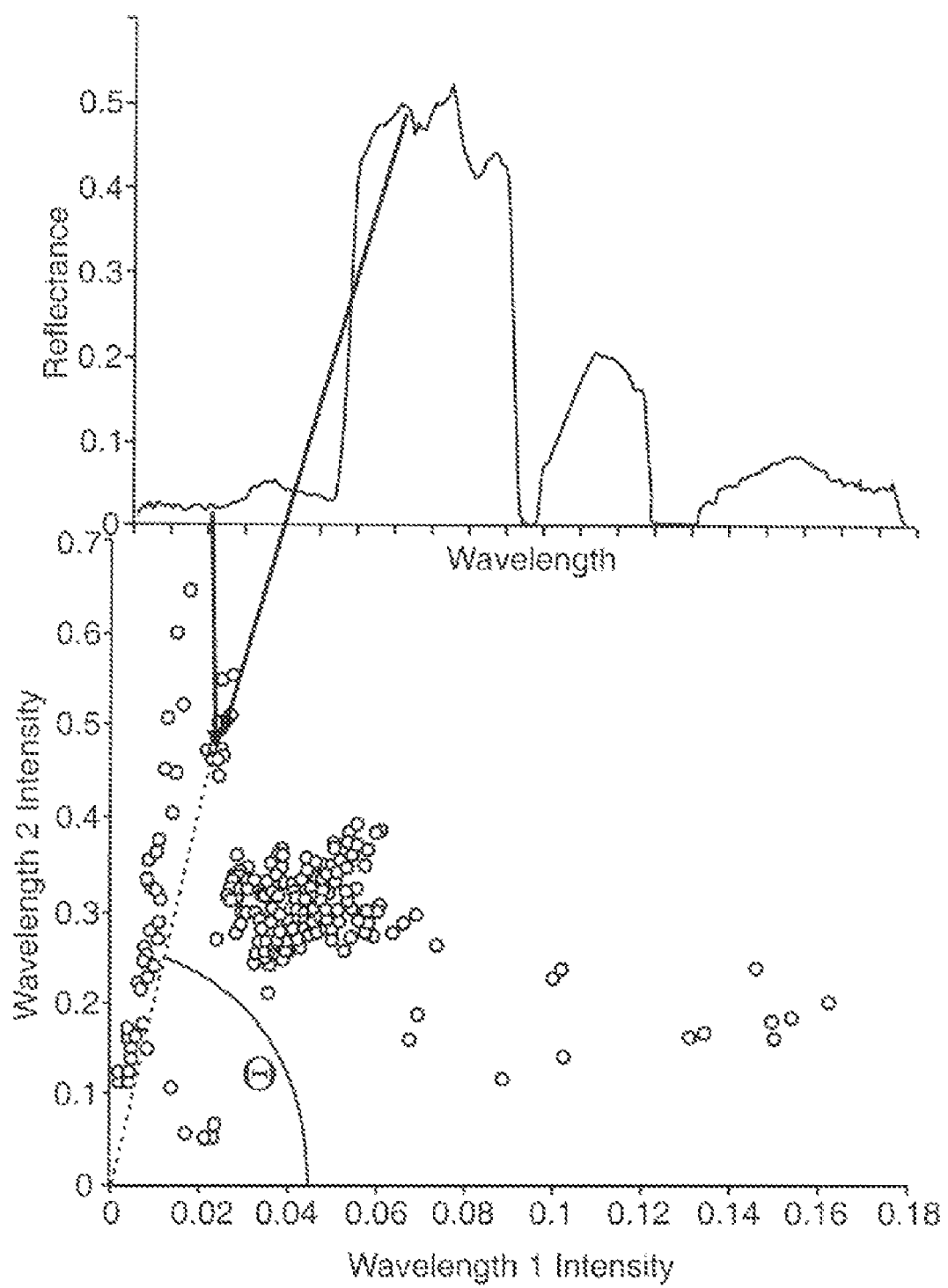
FIG. 2 are chart diagrams of the spectral angle radiance and wavelength.

FIG. 2 are chart diagrams of spectral angle which treats spectra as vectors in a multi-dimensional space. Coordinate axes of this space are the individual wavelengths for the spectra.

Figure 3:
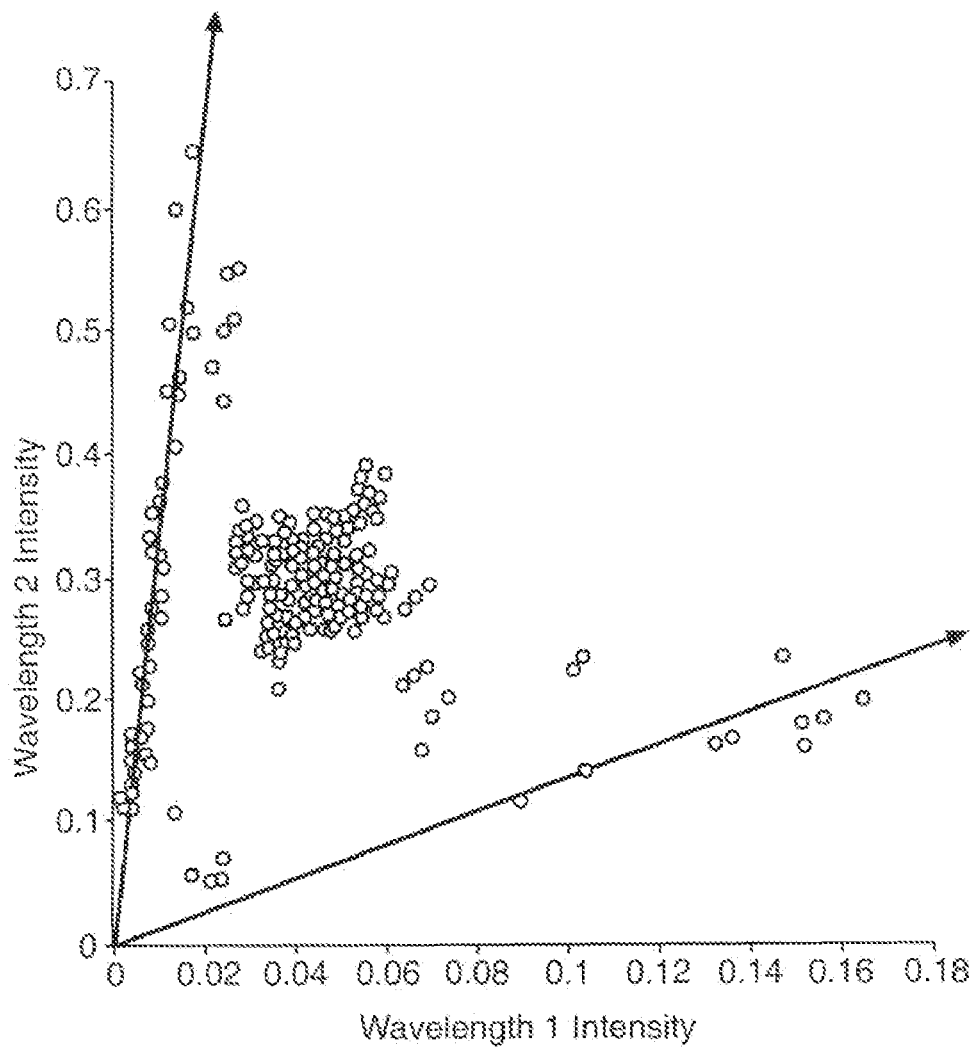
FIG. 3 is a chart diagram of the spectral angle clustering for two wavelength intensities.

FIG. 3 is a chart diagram of spectral angle clustering. The shape of the spectrum is represented by its spectral angle. A supposition says that items with the same reflectance spectrum with different illuminations should have the same spectral angle, but different apparent reflectance magnitudes. Objects of similar spectral shape should cluster along direction even when illumination varies.

Figure 4:
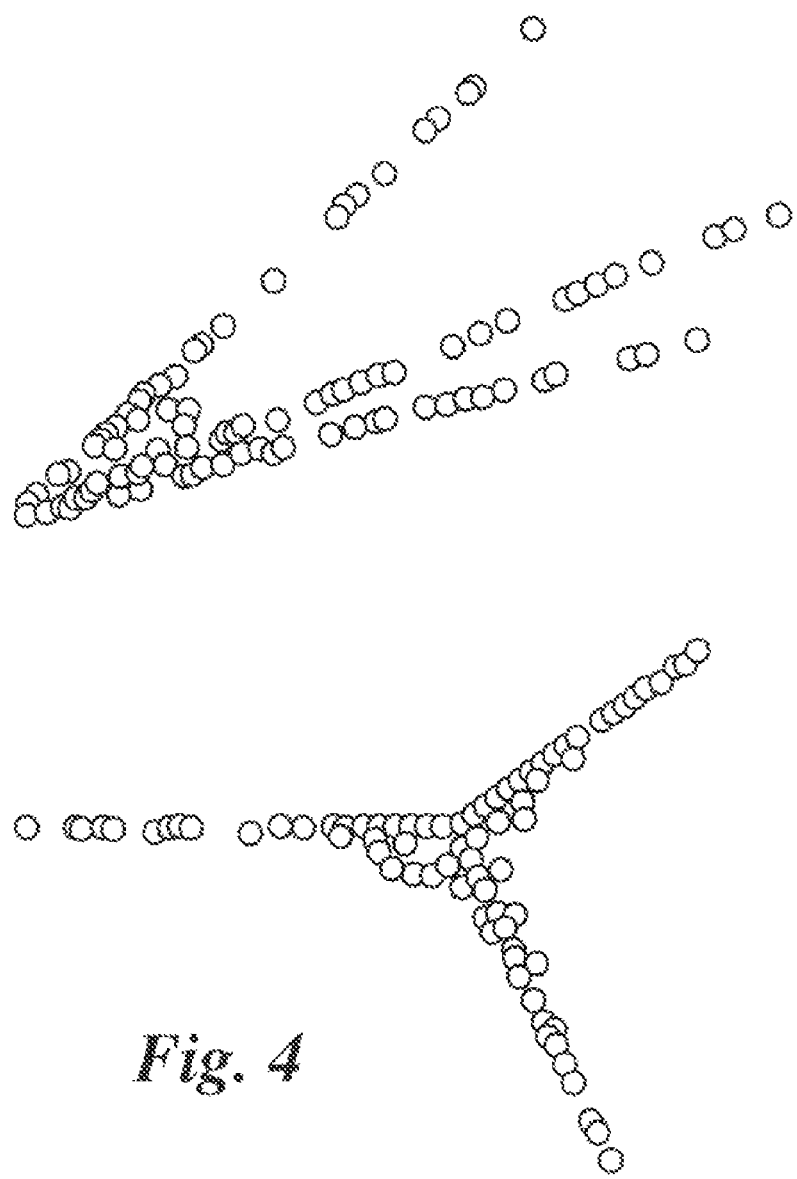
FIG. 4 is a chart diagram of the principal components analysis.

FIG. 4 is a chart diagram of principal components analysis (PCA). PCA is used to reduce the dimensionality of the data set. PCA also further separates classes of pixels along spectral angle. Time consuming, but vital to reducing the search time for clusters along spectral angle directions.

Figure 5:
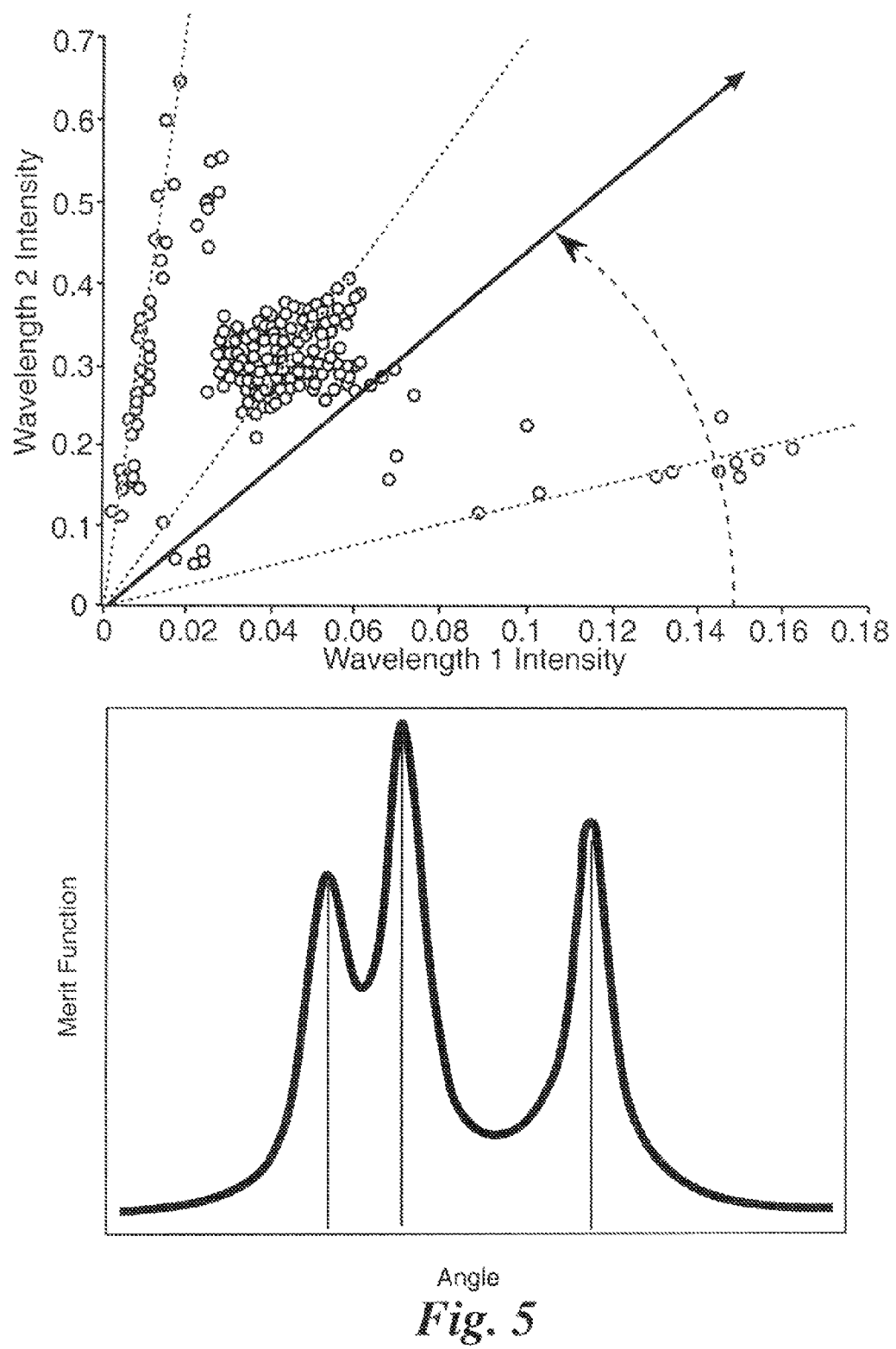
FIG. 5 are chart diagrams of pattern recognition.

FIG. 5 is a chart diagram of pattern recognition. A line from the origin is incrementally swept through the data. At each angle, a merit function is calculated for the data with respect to that angle. The merit function preferentially weights points along the chosen angle and far from the origin (to be resistant to noise). Peaks in the resulting merit function map represent a distinct class of objects.

Figure 6:
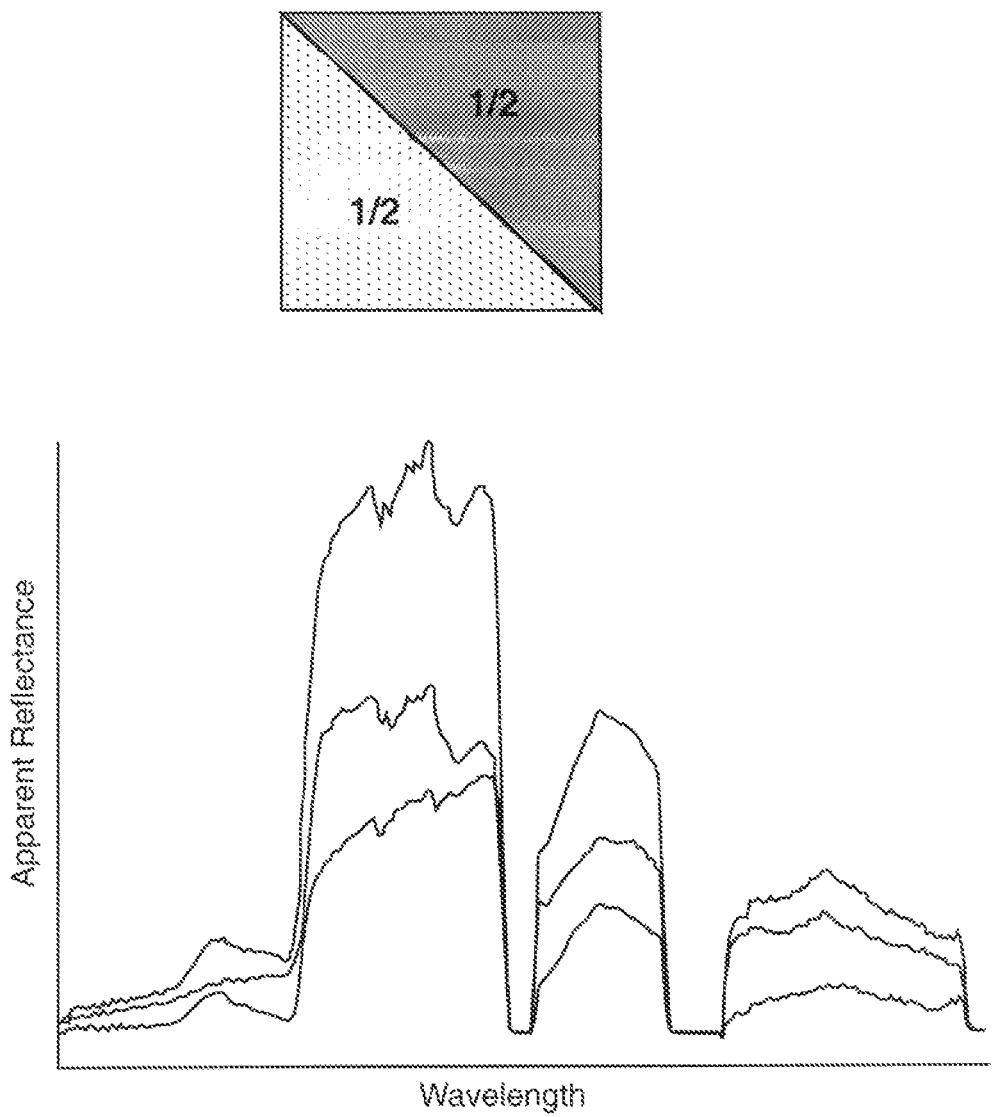
FIG. 6 is a chart depicting Bayesian unmixing.

FIG. 6 is a chart depicting Bayesian unmixing which converts spectra into probability distributions. Uses Bayes' Theorem to 'unmix' the fractional contribution of each endmember and constrains the unmixing result to have coefficients for each endmember $0 \leq C_i \leq 1$, $\Sigma\ C_i = 1$.

Figure 7:
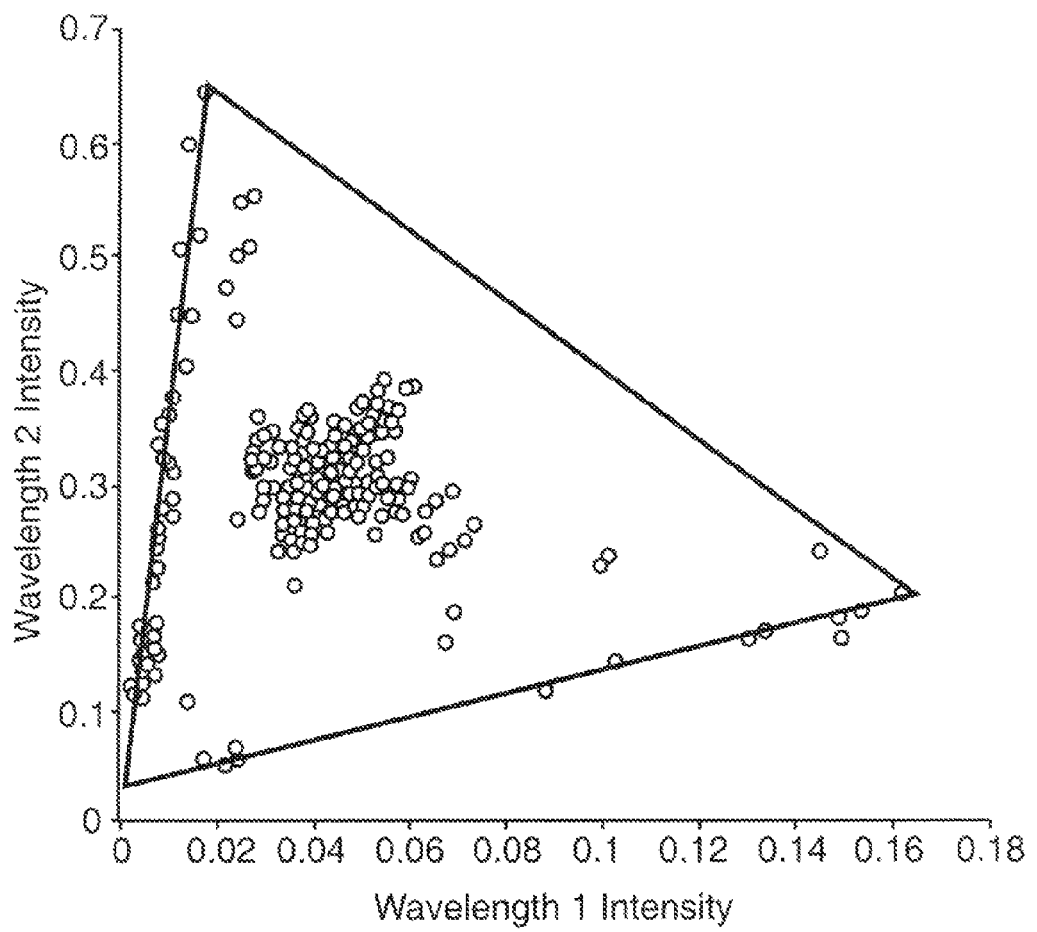
FIG. 7 is a chart diagram of the Convex Hull Model.

FIG. 7 is a chart diagram of a convex hull model. Endmebers are corners of simplexes fit around the data set. Points inside the simplex are linear combinations of the vertices with coefficients summing to one. Different view of things than Spectral Angle.

Figure 8:
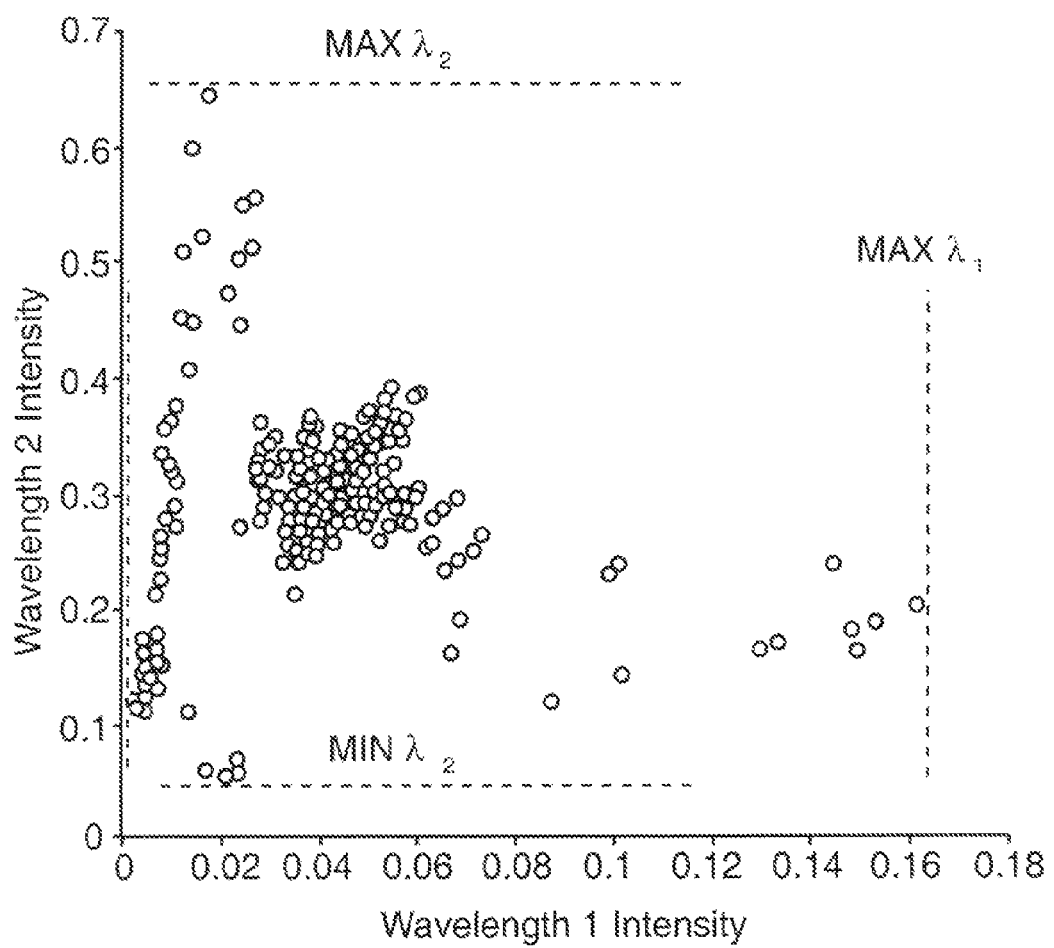
FIG. 8 is a chart diagram of the fast endmember retrieval.

FIG. 8 is a chart diagram of fast endmember retrieval. Outliers in magnitude at individual wavelengths are good endmember candidates — and are easy to find.

Figure 9:
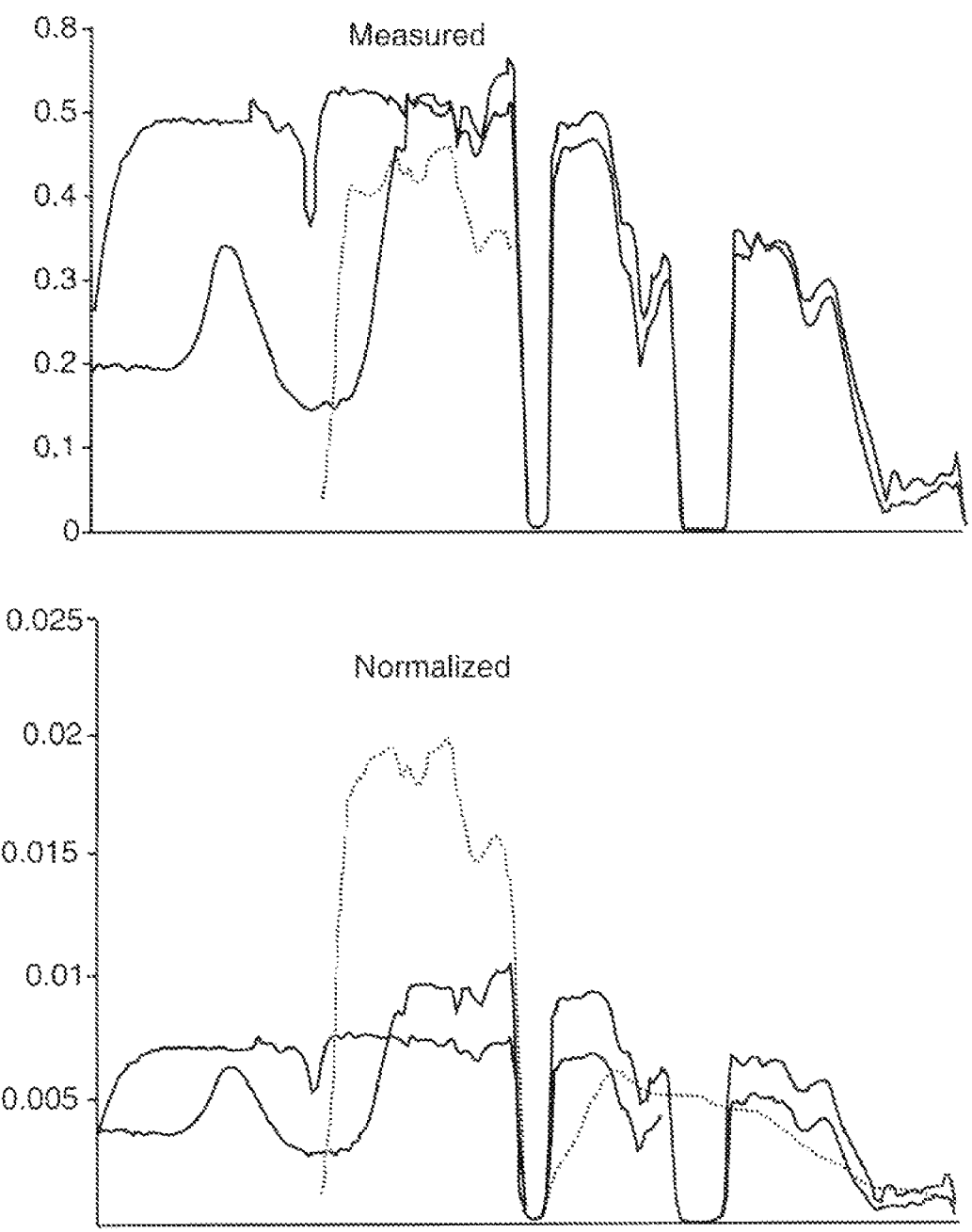
FIG. 9 are chart diagrams of the measured and normalized data.

FIG. 9 are chart diagrams of normalization. The min/max approach will not always find the simplex vertices. Simplex vertices don't tell the whole story - -we really want unique shapes. Pixels with unique spectral shapes may be missed due to pixels with overall higher reflectance or greater illumination. Normalization solves this - - note that we are no longer really trying to grab simplex vertices.

While the invention has been described in its presently preferred embodiment it is understood that the words which have been used are words of description rather than words of limitation and that the claims may be made without departing from the scope and spirit of the invention in its broader aspects.

What is claimed is:

1. A system for estimating basis spectra endmembers in hyperspectral data comprising:
   a means for acquiring hyperspectral data with spectra values;
   a means for normalizing all spectra values in the hyperspectral data;
   a means for scanning the hyperspectral data to find maxima and minima at each measured wavelength; and
   a means for identifying spatial pixels at which maxima and minima are found as possible basis spectra endmembers.

2. A system, as defined in claim 1, wherein said identifying means comprises:
   a means for setting a correlation coefficient threshold;
   a means for eliminating spectra with a correlation coefficient above the correlation coefficient threshold; and
   a means for confirming remaining spectra as endmembers.

* * * * *